R. PEET.
Plow.
No. 65,426.
Patented June 4, 1867.
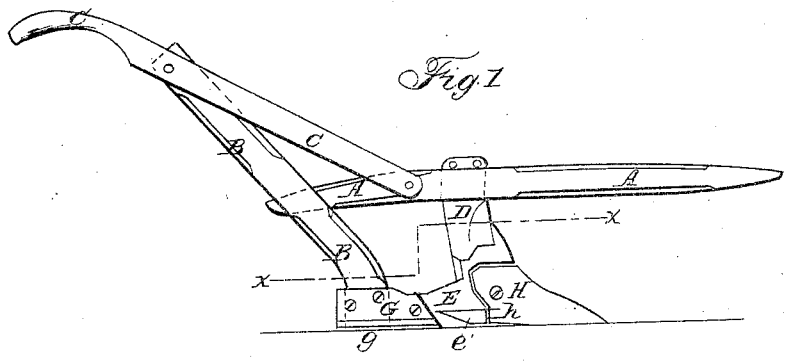
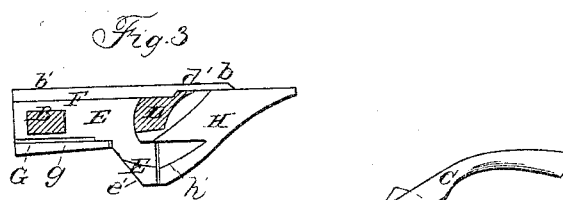
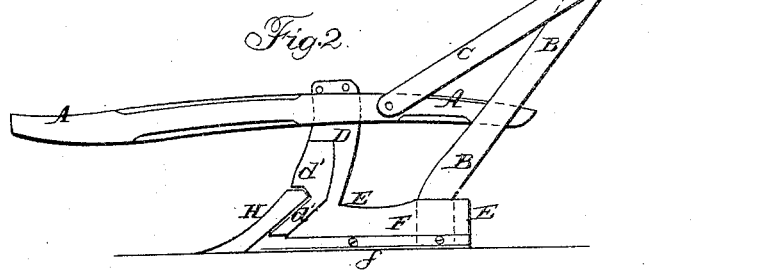
Inventor:
Rufus Peet
Per Munn & Co
Attorneys
Witnesses:
Theo Tusche
J. A. Service

United States Patent Office.

RUFUS PEET, OF CASTILE, NEW YORK

Letters Patent No. 65,426, dated June 4, 1867.

---

SUBSOIL PLOUGH.

---

*The Schedule referred to in these Letters Patent and making part of the same.*

---

TO ALL WHOM IT MAY CONCERN:

Be it known that I, RUFUS PEET, of Castile, in the county of Wyoming, and State of New York, have invented a new and improved Subsoil Plough; and I do hereby declare that the following is a full, clear, and exact description thereof, which will enable others skilled in the art to make and use the same, reference being had to the accompanying drawings, forming part of this specification. in which—

Figure 1 is a side view of my improved plough.

Figure 2 is a detail sectional view of the same, taken through the line $x\ x$, fig. 1.

Figure 3 is a view of the land-side of my improved plough.

Similar letters of reference indicate like parts.

My invention has for its object to furnish an improved subsoil plough, so constructed as to be easily repaired in any or all of its working parts, which shall be easily worked, and which will do its work effectually, loosening up the soil to any desired depth; and it consists in the construction, combination, and arrangement of its parts as hereinafter more fully described.

A is the beam, B is the standard, and C are the handles of the plough, about the construction of which parts there is nothing new. D is the upright, the upper end of which is attached to the beam A in the ordinary manner, and to the lower end of which is attached the body E of the plough. The body E of the plough is made longer and heavier than ordinary, to give steadiness to the plough when in use, and it is made with a wing, $e'$, projecting from its off side, extending out so far that the breadth of the base of the plough may equal that of the ordinary plough. F is a plate bolted to the land-side of the plough body E, and having a flange, $f'$, formed along its lower edge, as shown in figs. 2 and 3. G is a plate bolted to the body E of the plough upon its off side, and having a flange, $g'$, formed along its lower edge, as shown in figs 1 and 2. H is the point of the plough, which is made with a wing, $h'$, extending out as far as the wing $e'$ extends. The point or piece H extends up along and covers the forward part of the plough body, something in the form of a mould-board of an ordinary plough, having its flaring part cut off in a line with the body of the plough, so as not to turn the loosened soil over. Upon the land-side of the upright D is formed a projection, $d'$, to receive the friction, so that the friction upon the rear part of the plough body may be only such as arises from the loosened earth. By this construction the parts F, G, and H, which receive the wear, may be readily removed when worn, and repaired or replaced with new ones, as may be required.

What I claim as new, and desire to secure by Letters Patent, is—

1. The combination of the parts E F G H with each other and with the upright D and standard B; said parts being constructed and arranged substantially in the form and manner herein shown and described, and for the purpose set forth.

2. Forming a projection, $d'$, upon the land-side of the forward edge of the upright D, substantially as herein shown and described, and for the purpose set forth.

RUFUS PEET.

Witnesses:
H. W. SMITH,
R. GOULD.